United States Patent [19]

Badberg et al.

[11] 4,171,118

[45] Oct. 16, 1979

[54] MANDREL ASSEMBLY FOR VULCANIZING A VENT TUBE WITHIN THE BORE OF A FILLER NECK HOSE HAVING A COMPLEX MULTI-CURVED CONFIGURATION

[75] Inventors: Melvin C. Badberg; Roy W. Olsen, both of Lincoln, Nebr.

[73] Assignee: The Goodyear Tire & Rubber Company, Akron, Ohio

[21] Appl. No.: 946,932

[22] Filed: Sep. 28, 1978

[51] Int. Cl.² .............................................. B29C 1/12
[52] U.S. Cl. .................................... 249/183; 141/285; 156/294; 220/86 R
[58] Field of Search ........................ 249/183; 141/285; 156/294; 220/86 R

[56] References Cited

U.S. PATENT DOCUMENTS

| 1,721,253 | 7/1929 | Loughead et al. | 156/294 |
| 3,016,161 | 1/1962 | Peplin | 220/86 R |
| 3,187,936 | 6/1965 | Downing | 220/86 R |
| 3,865,666 | 2/1975 | Shoneg | 156/294 |

Primary Examiner—William E. Schulz
Attorney, Agent, or Firm—D. M. Ronyak

[57] ABSTRACT

A mandrel assembly for vulcanizing an elastomeric vent tube within the bore of a larger elastomeric filler neck hose having a complex, multi-curved configuration comprises an elastomeric flexible vent tube mandrel and a metallic filler neck mandrel having a groove oriented longitudinally along the curved surface of a depth for receiving a mandrel mounted vent tube therein such that a portion of the tube outside surface is in intimate contact with the bore surface of the filler neck hose when it is mounted on the filler neck mandrel. Upon vulcanization, the elastomeric mandrel is pulled out the vent tube and the filler neck hose is pulled off the filler neck mandrel with the vent tube being integrally joined to the filler neck hose bore at their contacting surfaces.

4 Claims, 2 Drawing Figures

MANDREL ASSEMBLY FOR VULCANIZING A VENT TUBE WITHIN THE BORE OF A FILLER NECK HOSE HAVING A COMPLEX MULTI-CURVED CONFIGURATION

BACKGROUND OF THE INVENTION

This invention generally relates to internally vented filler neck hoses and more particularly to a mandrel assembly for vulcanizing a vent tube within the bore of a filler neck hose, the filler neck hose having a complex multi-curved configuration.

Heretofore, automotive type filler neck pipes have been primarily a single straight-line metal pipe connected between the fuel entry port at an outside position on the vehicle to the fuel tank located in close proximity to the entry port and within the confines of the vehicle bodywork. In recent years however, safety has become of increasing concern and in view thereof manufacturers have constructed various type filler neck configurations that maintain a closure integrity in a crash situation. Such type configurations include filler necks of plastic, and/or rubber hose constructions which are attached between the entry port and fuel tank so as to maintain their closure integrity upon impact. In addition to the attention given to the filler neck construction, manufacturers have relocated vehicle fuel tanks in more obscure and protected locations within the body framework. In this circumstance, longer filler neck pipes had to be made to reach the tank from the more convenient fueling entry port usually located at the rear of the vehicle or at a location on the rear fender wall.

Coupled with the concern for safety, manufacturers have engaged upon development of systems for fuel vapor recovery as it relates to vehicle refueling so that the vapor generated in the fueling process may be drawn back to the pump and thus saved from being lost to the atmosphere. Such fuel vapor recovery also eliminates a hazard that exists when consumers, who are not versed in safety porcedures of pumping volitile and inflammable liquids must pump their own fuel at the service pump. In this circumstance, many and various type externally and internally vented filler neck pipes have been designed to recover the fuel vapor. However, and because of the long distance between the entry port and the tank, filler neck configurations have taken on extremely complex shapes so as to be positioned within existing vehicle bodywork. The complex contour required of the filler neck pipe has also created a problem in the mounting of the vapor recovery vent tube.

In view of the above the purpose of this invention is to provide a unique mandrel assembly that facilitates the manufacture of elastomeric hose-type filler neck pipes having complex molded, multi-curved configurations and vent tubes vulcanized internally within the filler neck hose bore.

DESCRIPTION OF THE DRAWING

A clear understanding of the invention will be had from the following description when considered in conjunction with the accompnaying drawing in which.

BRIEF DESCRIPTION OF THE INVENTION

Figures 1, 2:
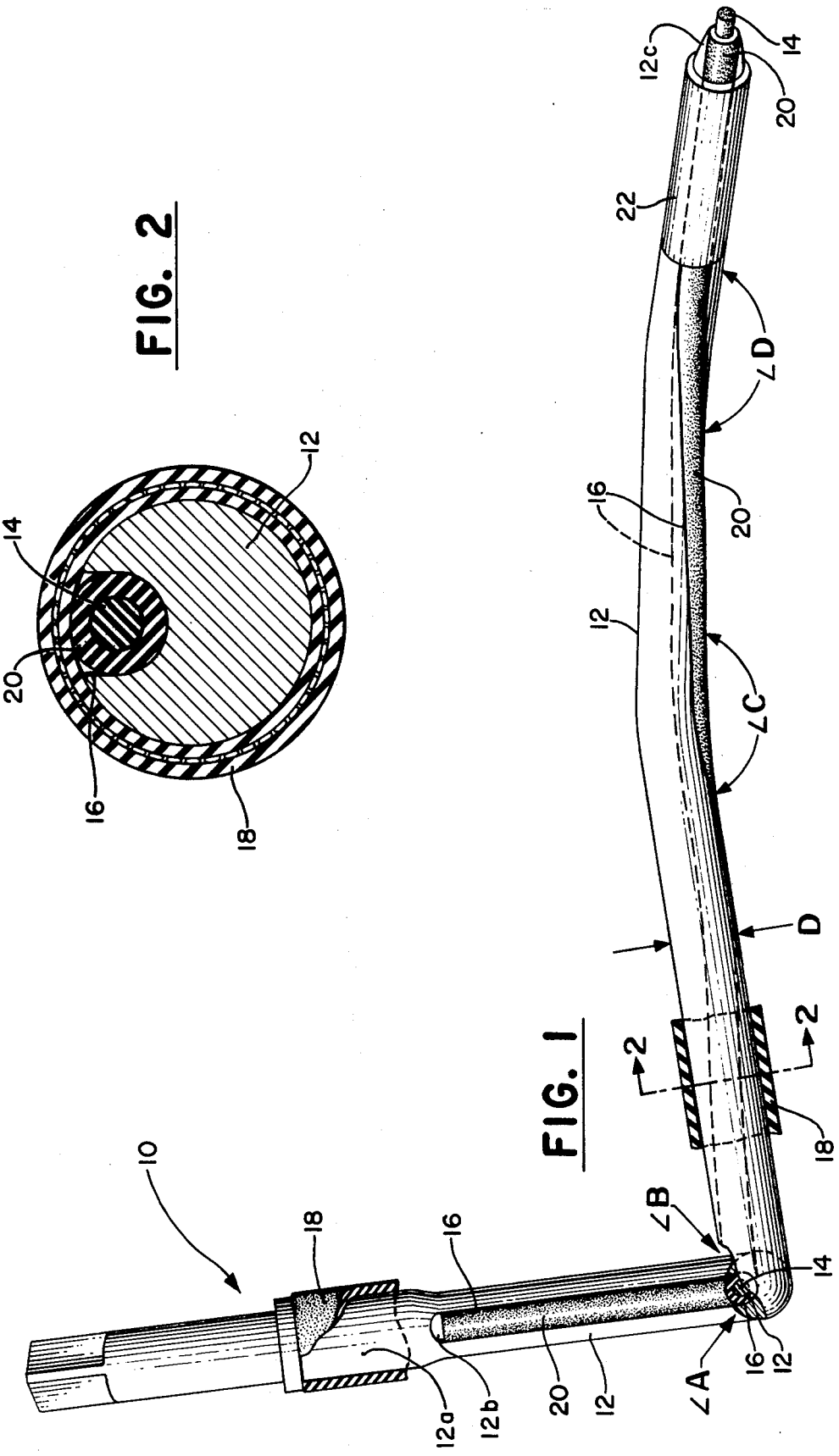
FIG. 1 is a perspective view showing the mandrel assembly with the filler neck hose and vent tube mounted thereon and with portions of the filler neck hose shown in section to better illustrate the arrangement of the components.
FIG. 2 is a sectional view through the assembly as taken on line 2—2 of FIG. 1.

Referring to the drawing, a mandrel assembly for forming a hose into a complex curved shape is generally indicated by reference numeral 10 and comprises a filler neck mandrel 12 and a vent tube mandrel 14. In order to meet the mounting requirements for the vehicle to which the filler neck is to be applied, the mandrel has a complex curved configuration which may include single or multiple acute angles A and B and/or obtuse angles C and D. The angles may or may not be in a single plane but in any case, the multiple bends in the mandrel are necessary to form a vulcanized filler hose having the required configuration to fit into the vehicle body and framework and interconnect the fuel entry port to the tank. The filler hose mandrel 12 is characterized by a longitudinal groove 16 that follows the contour of the curved mandrel in a somewhat spiralling fashion. Of course, the mandrel may be of any required diameter D that matches the bore diameter of an uncured elastomeric hose 18 which will serve as the filler neck pipe in the vehicle and may also be of any length dependent upon the distance between the entry port and fuel tank and the pathway it must follow to interconnect the two.

In order to provide for a vent tube within the bore of the filler neck hose 18, a flexible mandrel 14 is used to mount an elastomeric vent tube 20 thereon. The mandrel 14 may or may not be a solid but is an elastomeric material of the type known and used in the hose manufacturing industry, and may be reused in the manufacture of the internally vented filler neck hose. When the vent tube 20 is mounted on the mandrel 14 the two are positioned within the groove 16 on the filler neck mandrel. The tube may be held in place at the top or entry port end 12a by reason of a slight undercutting of a solid cylindrical or grooveless portion of the mandrel 12 such as at 12b in the drawing. At the opposite end 12c a cylindrical ring 22 is provided that is slipped over the mandrel-mounted vent tube 20 so as to hold it in place on the mandrel 12. Finally, an uncured elastomeric filler neck hose 18 is slipped onto the mandrel 12 and because of surface to surface contact between the outside of the vent tube and bore of the filler neck hose, the two hoses are integrally bonded at their contacting surfaces when subjected to a vulcanization heat and pressure. After curing of the elastomer is complete, the ring 22 is slipped off the mandrel 12, the elastomeric vent tube mandrel 14 is pulled out of the vent tube, and the filler neck hose 18 is removed from the mandrel 12. Thus it must be appreciated, that the vent tube 20 is vulcanized within the bore of the filler neck hose and follows the complex contoured shape from the entry port end 12a to the tank end 12c.

While certain representative embodiments and details have been shown for the purpose of illustrating the invention, it will be apparent to those skilled in this art that various changes and modifications may be made therein without departing from the spirit or scope of the invention.

What is claimed is:

1. A mandrel assembly for forming a filler neck hose into a complex multi-curved configuration and having an internal vent tube vulcanized within its bore comprising:

a metal mandrel for mounting an uncured length of filler neck hose thereon, said mandrel having a complex multi-curved configuration and a groove therein following longitudinally along its length; and a flexible elastomeric mandrel for mounting an uncured length of vent tubing thereon, said flexible mandrel and vent tubing positioned in the groove such that when the length of filler neck hose is mounted on the metal mandrel and the assembly subjected to vulcanization heat and pressure, the surface of its bore is in intimate contact with the outer surface of the tubing for the substantial length thereof and the filler neck hose and vent tube are integrally joined at their contacting surfaces.

2. The assembly as set forth in claim 1 wherein the metal mandrel is characterized by an enlarged end portion for forming a defined filler neck hose entry port and the opposite end has a recessed diameter portion and a cylindrical ring positioned thereon for holding the flexible mandrel-mounted vent tube within the groove on the metal mandrel.

3. The assembly as set forth in claim 2 wherein the groove is oriented in a partial spiral about the mandrel.

4. The assembly as set forth in claim 3 wherein the depth of the groove is at least between 75–125% of the diameter of the tubing.

* * * * *